(12) United States Patent
Wilson

(10) Patent No.: US 11,073,744 B1
(45) Date of Patent: Jul. 27, 2021

(54) PORTABLE BACKDROP FOR FILMING AND PHOTOGRAPHY

(71) Applicant: Daniel Wilson, Millville, MA (US)

(72) Inventor: Daniel Wilson, Millville, MA (US)

( * ) Notice: Subject to any disclaimer, the term of this patent is extended or adjusted under 35 U.S.C. 154(b) by 37 days.

(21) Appl. No.: 16/674,084

(22) Filed: Nov. 5, 2019

(51) Int. Cl.
*G03B 15/00* (2021.01)
*G09F 11/08* (2006.01)

(52) U.S. Cl.
CPC .............. *G03B 15/00* (2013.01); *G09F 11/08* (2013.01)

(58) Field of Classification Search
CPC ................................ A47B 97/02; G09F 11/08
See application file for complete search history.

(56) References Cited

U.S. PATENT DOCUMENTS

| | | | | |
|---|---|---|---|---|
| 1,813,980 | A * | 7/1931 | Williams | E06B 9/48 160/385 |
| 3,186,474 | A * | 6/1965 | Levitas | A47H 23/02 160/238 |
| 4,089,361 | A * | 5/1978 | Zeppmeisel | A47F 7/17 160/120 |
| 4,236,795 | A | 12/1980 | Kephart | |
| 5,389,993 | A | 2/1995 | Kdolphi | |
| 5,799,213 | A * | 8/1998 | Saar | G03B 15/06 396/3 |
| 5,953,542 | A | 9/1999 | Fleming | |
| D468,362 | S | 1/2003 | Zarelius | |
| 7,894,713 | B1 | 2/2011 | Clark | |
| 2008/0230191 | A1 * | 9/2008 | Ng | E06B 9/60 160/305 |
| 2010/0055661 | A1 * | 3/2010 | Hegwood | B43L 1/123 434/420 |
| 2010/0186908 | A1 * | 7/2010 | Meadows, Jr. | E06B 9/42 160/242 |
| 2011/0180219 | A1 * | 7/2011 | Pereira | E06B 9/42 160/89 |

(Continued)

FOREIGN PATENT DOCUMENTS

WO 2007131208 11/2007

OTHER PUBLICATIONS

Badgeplus Retractable Wall/Ceiling Photo ID Backdrop; http://www.badgeplus.com/photo-backdrop/retractable-photo-backdrop.html Archive.org copy dated Feb. 20, 2015 (Year: 2015).*

*Primary Examiner* — Clayton E. LaBalle
*Assistant Examiner* — Leon W Rhodes, Jr.
(74) *Attorney, Agent, or Firm* — Kyle A. Fletcher, Esq.

(57) ABSTRACT

The portable backdrop for filming and photography is configured for use in filming and photography. The portable backdrop for filming and photography is an opaque structure that forms a blind used to control the image captured by a camera. The portable backdrop for filming and photography comprises a roller clutch and spring system, one or more interchangeable blinds, a fastening structure, and a suspension structure. The fastening structure attach an interchangeable blind selected from the one or more interchangeable blinds to the roller clutch and spring system. The roller clutch and spring system deploys the selected interchangeable blind during a photographic or film session. The roller clutch and spring system retracts the selected interchangeable blind onto a scroll for storage. The suspension structure suspends the roller clutch and spring system and the selected interchangeable blind from an anchor point.

18 Claims, 5 Drawing Sheets

(56) References Cited

U.S. PATENT DOCUMENTS

| | | | | |
|---|---|---|---|---|
| 2012/0193041 | A1* | 8/2012 | Sun | G09F 11/21 |
| | | | | 160/241 |
| 2013/0097058 | A1 | 4/2013 | Baker | |
| 2013/0199063 | A1* | 8/2013 | Buffington | G09F 11/21 |
| | | | | 40/515 |
| 2018/0136545 | A1 | 5/2018 | Jackson | |
| 2018/0313082 | A1* | 11/2018 | Klein | B32B 27/12 |

* cited by examiner

PORTABLE BACKDROP FOR FILMING AND PHOTOGRAPHY

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of apparatus or arrangements for taking photographs including accessories for cameras, more specifically, an accessory not provided for in groups G03B17/561 through G03B17/566. (G03B17/568)

SUMMARY OF INVENTION

The portable backdrop for filming and photography is a backdrop. The portable backdrop for filming and photography is configured for use in filming and photography. The portable backdrop for filming and photography is an opaque structure that forms a blind used to control the image captured by a camera. The portable backdrop for filming and photography comprises a roller clutch and spring system, one or more interchangeable blinds, a fastening structure, and a suspension structure. The from the one or more interchangeable blinds to the roller clutch and spring system. The roller clutch and spring system deploys the selected interchangeable blind during a photographic or film session. The roller clutch and spring system retracts the selected interchangeable blind onto a scroll for storage. The suspension structure suspends the roller clutch and spring system and the selected interchangeable blind from an anchor point.

These together with additional objects, features and advantages of the portable backdrop for filming and photography will be readily apparent to those of ordinary skill in the art upon reading the following detailed description of the presently preferred, but nonetheless illustrative, embodiments when taken in conjunction with the accompanying drawings.

In this respect, before explaining the current embodiments of the portable backdrop for filming and photography in detail, it is to be understood that the portable backdrop for filming and photography is not limited in its applications to the details of construction and arrangements of the components set forth in the following description or illustration. Those skilled in the art will appreciate that the concept of this disclosure may be readily utilized as a basis for the design of several purposes of the portable backdrop for filming and photography.

It is therefore important that the claims be regarded as including such equivalent construction insofar as they do not depart from the spirit and scope of the portable backdrop for filming and photography. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
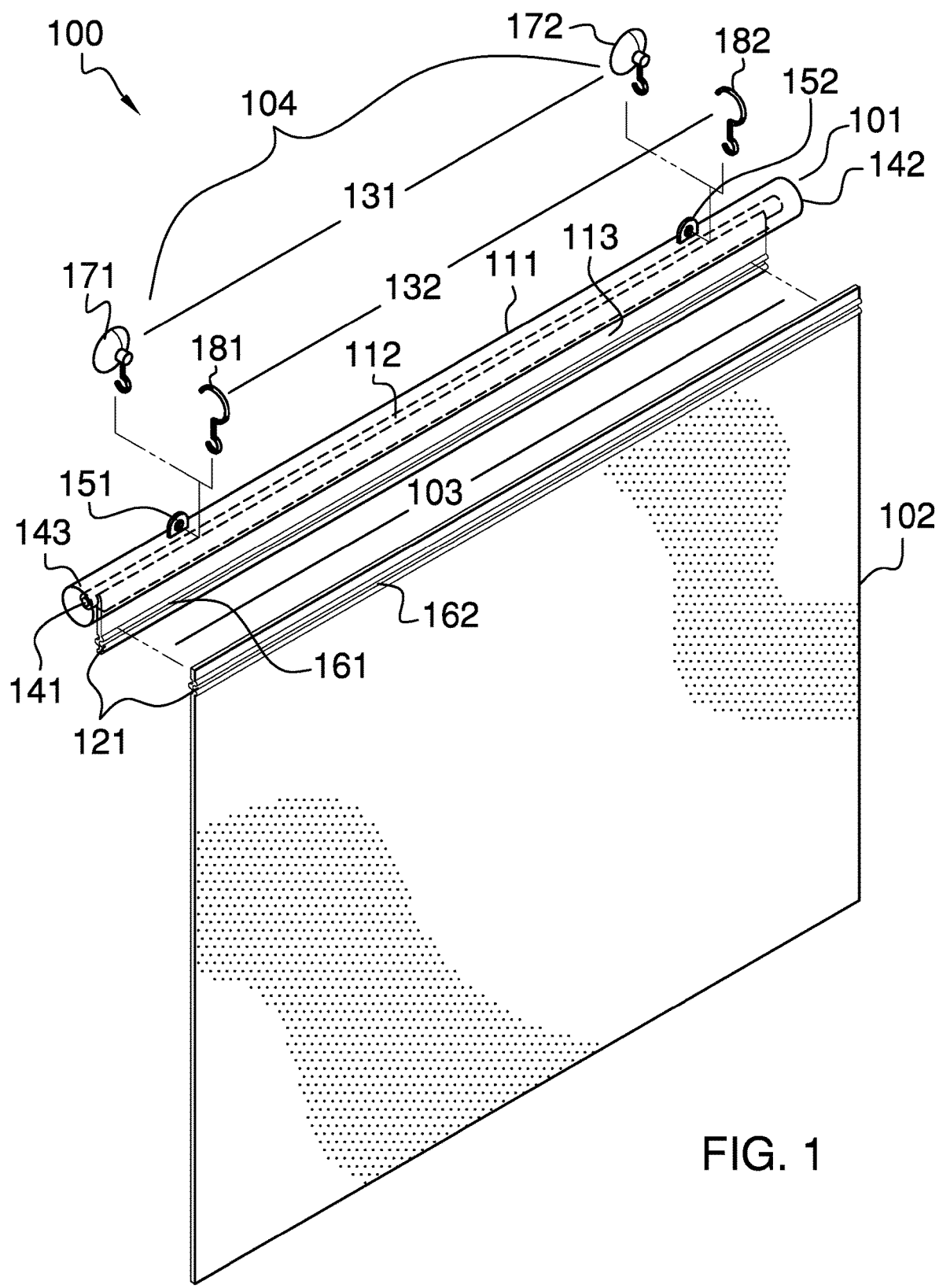
FIG. 1 is a perspective view of an embodiment of the disclosure.
Figure 2:
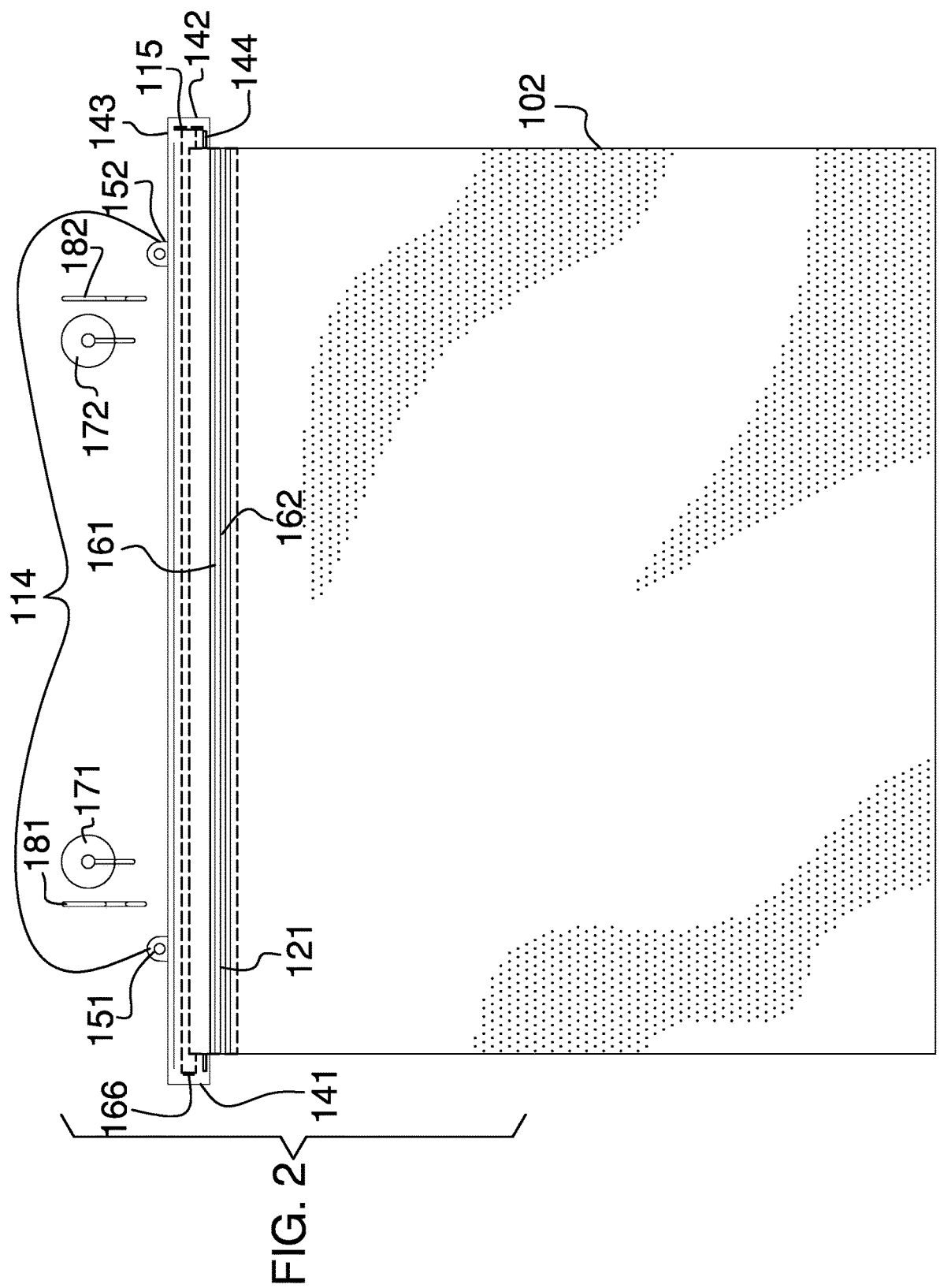
FIG. 2 is a front view of an embodiment of the disclosure.
Figure 3:
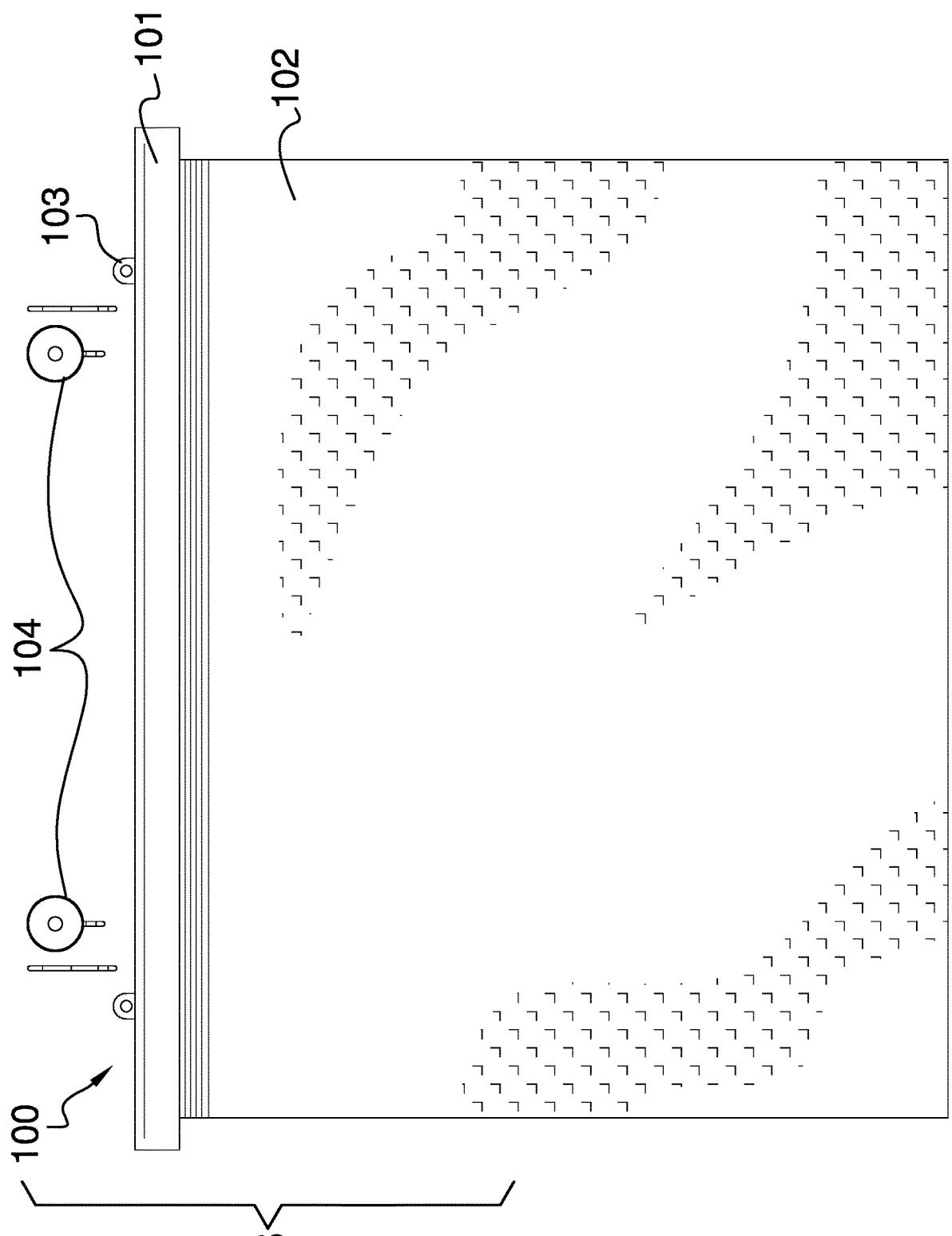
FIG. 3 is a rear view of an embodiment of the disclosure.
Figure 4:
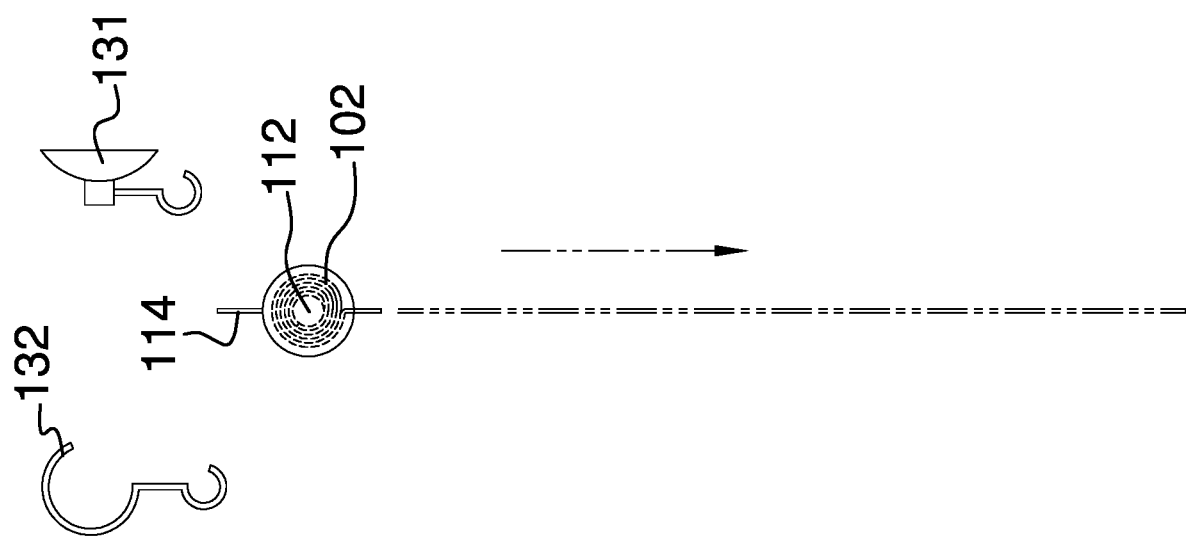
Figure 5:
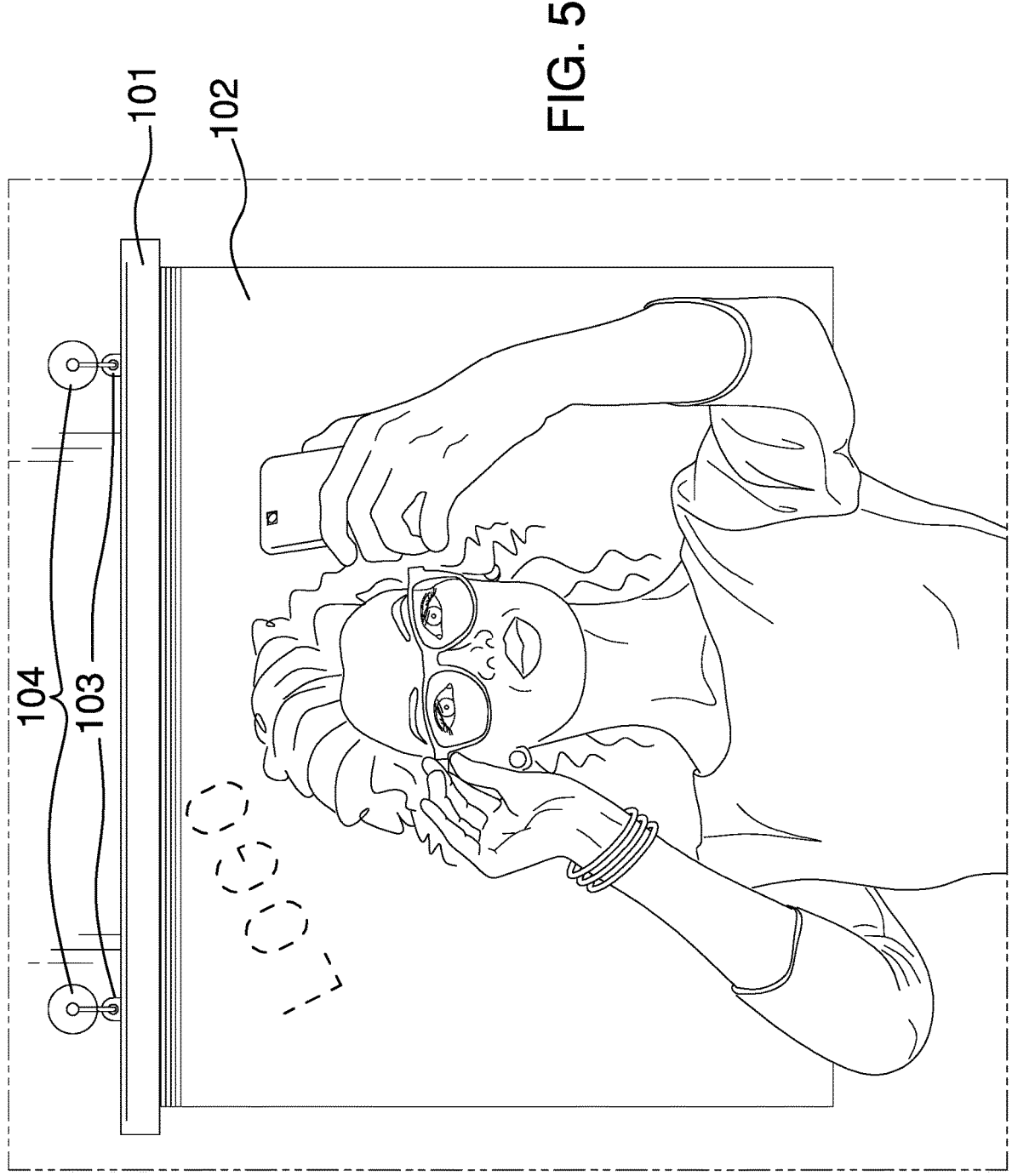
FIG. 5 is an in-use view of an embodiment of the disclosure.

Detailed reference will now be made to one or more potential embodiments of the disclosure, which are illustrated in FIGS. 1 through 5.

The portable backdrop for filming and photography 100 (hereinafter invention) is a backdrop. The invention 100 is configured for use in filming and photography. The invention 100 is an opaque structure that forms a blind used to control the image captured by a camera. The invention 100 comprises a roller clutch and spring system 101, one or more interchangeable blinds 102, a fastening structure 103, and a suspension structure 104. The fastening structure 103 attaches an interchangeable blind selected from the one or more interchangeable blinds 102 to the roller clutch and spring system 101. The roller clutch and spring system 101 deploys the selected interchangeable blind during a photographic or film session. The roller clutch and spring system 101 retracts the selected interchangeable blind onto a scroll for storage. The suspension structure 104 suspends the roller clutch and spring system 101 and the selected interchangeable blind from an anchor point.

The roller clutch and spring system 101 is a mechanical structure. The roller clutch and spring system 101 stores an interchangeable blind selected from the one or more interchangeable blinds 102 as a spool. The roller clutch and spring system 101 deploys the selected interchangeable blind as a sheeting during a photographic session. The roller clutch and spring system 101 retracts the selected interchangeable blind back onto the spool at the end of the photographic session. The roller clutch and spring system 101 suspends the selected interchangeable blind from an anchor point during the comprises a housing 111, a cylindrical roller 112, a binding strip 113, a plurality of eyebolts 114, a clutch 115, and a spring return 116.

The housing 111 is a prism-shaped structure. The housing 111 is a rigid casing. The housing 111 contains the cylindrical roller 112, the binding strip 113, the clutch 115, and the spring return 116. The housing 111 further contains a binding strip 113 that attaches an interchangeable blind selected from the one or more interchangeable blinds 102 to the cylindrical roller 112. The housing 111 is formed with all apertures and form factors necessary to allow the housing 111 to accommodate the use and operation of the selected intermediate blind, the cylindrical roller 112, the binding strip 113, the clutch 115, and the spring return 116. Methods to form a housing 111 suitable for the purposes described in this disclosure are well-known and documented in the mechanical arts. The housing 111 further comprises a first congruent end 141, a second congruent end 142, a lateral face 143, and an interchangeable blind slot 144.

The first congruent end 141 is a congruent end of the prism structure that forms the housing 111. The second congruent end 142 is a congruent end of the prism structure that forms the housing 111. The second congruent end 142 is distal from the defined elsewhere in this disclosure. The lateral face 143 is the lateral face of the prism structure that forms the housing 111. The lateral face of a prism is defined elsewhere in this disclosure.

The interchangeable blind slot 144 is a slot that is formed through the lateral face 143 of the housing 111. The interchangeable blind selected from the one or more interchangeable blinds 102 deploys from and withdraws into the housing 111 through the interchangeable blind slot 144. The position of the interchangeable blind slot 144 is such that the interchangeable blind slot 144 is parallel to the center axis of the prism structure that forms the housing 111.

The cylindrical roller 112 is a prism-shaped shaft. The cylindrical roller 112 installs in the housing 111 such that the center axis of the cylindrical roller 112 aligns with the center axis of the housing 111. The cylindrical roller 112 installs in the housing 111 such that the cylindrical roller 112 rotates within the housing 111.

The binding strip 113 attaches the interchangeable blind selected from the one or more interchangeable blinds 102 to the cylindrical roller 112 such that the selected interchangeable blind spools onto the cylindrical roller 112 for storage. The binding strip 113 is a rectangular sheeting structure. An edge roller 112. The interchangeable blind selected from the one or more interchangeable blinds 102 attaches to the edge of the binding strip 113 that is distal from the attachment edge of the binding strip 113 to the cylindrical roller 112 such that the binding strip 113 will pull the selected interchangeable blind onto the cylindrical roller 112 during the spooling process. The fastening structure 103 removably attaches the selected interchangeable blind to the binding strip 113.

Each of the plurality of eyebolts 114 is a hardware item that attaches to the lateral face 143 of the housing 111. Each of the plurality of eyebolts 114 forms a structure that allows the suspension structure 104 to attach to the housing 111. The plurality of eyebolts 114 further comprises a first eyebolt 151 and a second eyebolt 152.

The first eyebolt 151 is an eyebolt that attaches to the lateral face 143 of the housing 111 at a location between the first congruent end 141 and the second eyebolt 152. The second eyebolt 152 is an eyebolt that attaches to the lateral face 143 of the housing 111 at a location between the second congruent end 142 and the first eyebolt 151.

The clutch 115 is a mechanical structure. When the clutch 115 is enabled, the clutch 115 limits the rotation of the cylindrical roller 112 to a direction that allows the spooled interchangeable blinds 102 to be deployed from the cylindrical roller 112. The clutch 115 mechanism of a roller clutch and spring system 101 is defined elsewhere in this disclosure.

The spring return 116 is a mechanical structure. The spring return 116 disables the operation of the clutch 115 such that the clutch 115 can rotate in a direction that spools the selected interchangeable blind onto the cylindrical roller 112. The spring return 116 is a spring-loaded device. The spring return 116 is deformed during the deployment of the interchangeable blind selected from the one or more interchangeable blinds 102 such that the spring return 116 stores the energy necessary to rotate the cylindrical roller 112 in a manner that respools the interchangeable blind selected from the one or more interchangeable blinds 102 back onto the cylindrical roller 112.

The clutch 115 and the spring return 116 of the roller clutch and spring system 101, as well as the roller clutch and spring system 101 itself, are defined in greater detail elsewhere in this disclosure.

Each of the one or more interchangeable blinds 102 is an opaque sheeting structure. Each of the one or more interchangeable blinds 102 has a rectangular shape. Each of the one or more interchangeable blinds 102 forms a backdrop for a blinds 102 blocks the view of objects behind the target of the photographic session such that the target of the photographic session becomes the clear focus of images generated during the photographic session. Each of the one or more interchangeable blinds 102 has an identical form factor.

Any first interchangeable blind selected from the one or more interchangeable blinds 102 differs from any second interchangeable blind selected from the one or more interchangeable blinds 102 in the visual characteristics, such as color or presented images, presented by the selected interchangeable blind. Each of the one or more interchangeable blinds 102 removably attaches to the roller clutch and spring system 101 such that any first interchangeable blind selected from the one or more interchangeable blinds 102 can be replaced by any second interchangeable blind selected from the one or more interchangeable blinds 102.

The fastening structure 103 is a fastening device. The fastening structure 103 attaches an interchangeable blind selected from the one or more interchangeable blinds 102 to the roller clutch and spring system 101 by attaching the selected interchangeable blind to the binding strip 113 of the roller clutch and spring system 101. The fastening structure 103 comprises a zipper structure. The zipper structure forms a sliding fastener.

The zipper structure comprises a first chain 161 and a second chain 162. The first chain 161 is an element of the zipper structure. The first chain 161 attaches to the binding strip 113 of the roller clutch and spring system 101. The second chain 162 is an element of the zipper structure. The second chain 162 attaches to the interchangeable blind selected from the one or more interchangeable blinds 102 that attaches to the binding strip 113. Each interchangeable blind selected from the one or more interchangeable blinds 102 is formed with a second chain 162.

The suspension structure 104 is a mechanical structure. The suspension structure 104 suspends the roller clutch and spring system 101 at an elevation above the supporting surface on which the photographic session occurs. The suspension of the roller clutch and spring system 101 by the suspension structure 104 allows the one or more interchangeable blinds 102 to hang in a vertical orientation behind the target of the photographic session. The suspension structure 104 is selected from the group consisting of a plurality of suction cups 131 and a plurality of S-hooks 132.

Each of the plurality of suction cups 131 suspends the roller clutch and spring system 101 from an attachment surface. Each of the plurality of suction cups 131 is a commercially available suction cup. Each of the plurality of suction cups 131 further comprises a hook. Each of the plurality of suction cups 131 hooks to an eyebolt selected from the plurality of eyebolts 114. Each of the plurality of suction cups 131 is an apparatus that creates a partial vacuum relative to the atmosphere between the surface of the each selected suction cup and an attachment surface. This pressure differential between the partial vacuum and the atmospheric pressure provides the force necessary to secure the attached roller clutch and spring system 101 to the attachment surface. The plurality of suction cups 131 comprises a first suction cup 171 and a second suction cup 172.

The first suction cup 171 is the suction cup selected from the plurality of suction cups 131 that attaches the first eyebolt 151 of the plurality of eyebolts 114 to the attachment surface. The second suction cup 172 is the suction cup selected from the plurality of suction cups 131 that attaches the second eyebolt 152 of the plurality of eyebolts 114 to the attachment surface.

Each of the plurality of S-hooks 132 suspends the roller clutch and spring system 101 from an attachment surface. Each of the plurality of S-hooks 132 is a commercially available S-hook. Each of the plurality of S-hooks 132 hooks to an eyebolt selected from the plurality of eyebolts 114. Each of the plurality of S-hooks 132 hooks the roller clutch and spring system 101 to an attachment structure mounted on an attachment surface. The plurality of S-hooks 132 comprises a first S-hook 181 and a second S-hook 182.

The first S-hook 181 is the S-hook selected from the plurality of S-hooks 132 that attaches the first eyebolt 151 of the plurality of eyebolts 114 to the attachment surface. The second S-hook 182 is the S-hook selected from the plurality of S-hooks 132 that attaches the second eyebolt 152 of the plurality of eyebolts 114 to the attachment surface.

The following definitions were used in this disclosure:

Anchor: As used in this disclosure, anchor means to hold an object firmly or securely.

Anchor Point: As used in this disclosure, an anchor point is a location to which a first object can be securely attached to a second object.

Blind: As used in this disclosure, a blind is a structure that blocks the passage of light through the structure.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Cord: As used in this disclosure, a cord is a long, thin, flexible, and prism shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, and rope are synonyms for cord.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Eyebolt: As used in this disclosure, an eyebolt is a bolt that is formed with a ring at one end. The ring is commonly referred to as an eyelet.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Hang: As used in this disclosure, to hang an object is to suspend an object above a surface from above such that the inferior end of the object does not form a significant portion of the load path of the object.

Hook: As used in this disclosure, a hook is an object that is curved or bent at an angle such that items can be hung on or caught by the object.

Hardware: As used in this disclosure, refers to one or more incidental objects: 1) that are readily and commercially available; and, 2) that are associated with the installation, operation or maintenance of a primary object. Always use incidental.

Housing: As used in this disclosure, a housing is a rigid structure that encloses and protects one or more devices.

Incidental: As used in this disclosure, incidental refers to a second object that is associated with a first object but that: 1) does not significantly affect the characteristics of the first object; and, 2) the function of which can be readily replaced by or substituted with a third object.

Inferior: As used in this disclosure, the term inferior refers to a directional reference that is parallel to and in the same direction as the force of gravity when an object is positioned or used normally.

Intermediate Structure: As used in this disclosure, an intermediate structure refers is an inert structure that attaches a first object to a second object.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Non-Euclidean Prism: As used in this disclosure, a non-Euclidean prism is a prism structure wherein the center axis of the prism lies on a non-Euclidean plane or is otherwise formed with a curvature.

Opaque: As used in this disclosure, opaque refers to an object or material that prevents the passage of radiation through the object or material.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Ratchet: As used in this disclosure, a ratchet is a device comprising a pawl or hinged catch that engages the sloping teeth of a wheel or bar permitting motion in one direction only.

Roller Clutch and Spring System: As used in this disclosure, a roller clutch and spring system is a commercially available system for storing a sheeting on a scroll or loading a cord on a spool. The sheeting is stored on a rotating cylindrical roller as the scroll. The cord is stored on the spool. The clutch portion of the roller clutch and spring system is configured to allow the rotating cylindrical roller to rotate in a first direction. The spring portion of the roller clutch and spring system is configured to return the rotating cylindrical roller to its original position when the clutch portion is released. A common example of the roller clutch and spring system is the mechanism used to raise and lower window blinds. Always use scroll cord spool.

S-Hook: As used in this disclosure, the S-hook is a non-Euclidean prism structure that has the shape of the letter S. The S-hook is a fastening device that attaches a first object to a second object. Specifically, the S-hook hangs from the first object such that the second object may be suspended from the first object. The S-hook is a well-known and commercially available structure.

Scroll: As used in this disclosure, a scroll is a sheeting that is stored as a roll.

Sheeting: As used in this disclosure, a sheeting is a material, such as a paper, textile, a plastic, or a metal foil, in the form of a thin flexible layer or layers.

Slot: As used in this disclosure, a slot is a long narrow cut or opening that is formed in or through an object.

Spool: As used in this disclosure, a spool is a cylindrical device upon which a flexible material, including but not limited to a yarn, a cord, or a tape, can be wound. Depending on the context, a spool may also contain the flexible material stored upon the spool.

Suction Cup: As used in this disclosure, a suction cup means an object or device that uses negative fluid pressure of air or water to adhere to nonporous surfaces by creating a partial vacuum.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Suspend: As used in this disclosure, to suspend an object means to support an object such that the inferior end of the object does not form a significant portion of the load path of the object.

Zipper: As used in this disclosure, a zipper is a fastening device comprising a first chain structure, a second chain structure, and a zipper pull. The first chain structure and the second chain structure are formed with interlocking components that form a chain. The chain is opened and closed by pulling a slide, called a zipper pull, over the first chain structure and the second chain structure. This zipper structure is commonly seen on plastic food storage bags. When the first chain is manually attached to the second chain without a zipper pull, the resulting zipper structure is called a sliding fastener.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A portable backdrop system for filming and photography comprising
 a roller clutch and spring system, a plurality of interchangeable blinds, a fastening structure, and a suspension structure;
 wherein the fastening structure attaches an interchangeable blind selected from the plurality of interchangeable blinds to the roller clutch and spring system;
 wherein the suspension structure suspends the roller clutch and spring system and the selected interchangeable blind from an anchor point;
 wherein the portable backdrop for filming and photography is an opaque structure that forms a blind used to control the image captured by a camera;
 wherein the roller clutch and spring system stores an interchangeable blind selected from the plurality of interchangeable blinds as a spool;
 wherein the roller clutch and spring system suspends the selected interchangeable blind;
 wherein the roller clutch and spring system comprises a housing, a cylindrical roller, a binding strip, a plurality of eyebolts, a clutch, and a spring return;
 wherein the housing contains the cylindrical roller, the binding strip, the clutch, and the spring return;

wherein the plurality of eyebolts attach to the housing;
wherein a first interchangeable blind selected from the plurality of interchangeable blinds differs from a second interchangeable blind selected from the plurality of interchangeable blinds in the visual characteristics presented by the selected interchangeable blind.

2. The portable backdrop system for filming and photography according to claim 1
wherein the roller clutch and spring system deploys the selected interchangeable blind; wherein the roller clutch and spring system retracts the selected interchangeable blind onto a scroll for storage.

3. The portable backdrop system for filming and photography according to claim 2
wherein each of the plurality of interchangeable blinds is an opaque sheeting structure;
wherein each of the plurality of interchangeable blinds has a rectangular shape;
wherein each of the plurality of interchangeable blinds blocks the view through any interchangeable blind selected from the plurality of interchangeable blinds.

4. The portable backdrop system for filming and photography according to claim 3
wherein each of the plurality of interchangeable blinds has an identical form factor;
wherein each of the plurality of interchangeable blinds removably attaches to the roller clutch and spring system such that any first interchangeable blind selected from the plurality of interchangeable blinds can replace by any second interchangeable blind selected from the plurality of interchangeable blinds.

5. The portable backdrop system for filming and photography according to claim 4 wherein
the suspension structure is a mechanical structure;
wherein the suspension structure suspends the roller clutch and spring system at an elevation;
wherein the suspension of the roller clutch and spring system by the suspension structure allows the plurality of interchangeable blinds to hang in a vertical orientation;
wherein the suspension structure is selected from the group consisting of a plurality of suction cups and a plurality of S-hooks.

6. The portable backdrop system for filming and photography according to claim 5
wherein each of the fastening structure is a fastening device;
wherein each of the fastening structure attaches an interchangeable blind selected from the plurality of interchangeable blinds to the roller clutch and spring system by attaching the selected interchangeable blind to the binding strip of the roller clutch and spring system.

7. The portable backdrop system for filming and photography according to claim 6
wherein the housing is a prism-shaped structure; wherein the housing is a rigid casing.

8. The portable backdrop system for filming and photography according to claim 7
wherein the housing further comprises a first congruent end, a second congruent end, a lateral face, and an interchangeable blind slot;
wherein the first congruent end is a congruent end of the prism structure that forms the housing;
wherein the second congruent end is a congruent end of the prism structure that forms the housing;
wherein the second congruent end is distal from the first congruent end;
wherein the lateral face is the lateral face of the prism structure that forms the housing;
wherein the interchangeable blind slot is a slot that is formed through the lateral face of the housing;
wherein the interchangeable blind selected from the plurality of interchangeable blinds deploys from and withdraws into the housing through the interchangeable blind slot;
wherein the position of the interchangeable blind slot is such that the interchangeable blind slot is parallel to the center axis of the prism structure that forms the housing.

9. The portable backdrop system for filming and photography according to claim 8
wherein the cylindrical roller is a prism-shaped shaft;
wherein the cylindrical roller installs in the housing such that the center axis of the cylindrical roller aligns with the center axis of the housing;
wherein the cylindrical roller installs in the housing such that the cylindrical roller rotates within the housing.

10. The portable backdrop system for filming and photography according to claim 9
wherein the binding strip is a rectangular sheeting structure;
wherein an edge of the binding strip permanently attaches to the cylindrical roller;
wherein the interchangeable blind selected from the plurality of interchangeable blinds attaches to the edge of the binding strip that is distal from the attachment edge of the binding strip to the cylindrical roller such that the binding strip will pull the selected interchangeable blind onto the cylindrical roller during the spooling process.

11. The portable backdrop system for filming and photography according to claim 10
wherein the fastening structure removably attaches the selected interchangeable blind to the binding strip.

12. The portable backdrop system for filming and photography according to claim 11
wherein each of the plurality of eyebolts attaches to the lateral face of the housing;
wherein each of the plurality of eyebolts forms a structure that allows the suspension structure to attach to the housing.

13. The portable backdrop system for filming and photography according to claim 12
wherein the clutch is a mechanical structure;
wherein the clutch limits the rotation of the cylindrical roller to a direction that allows the spooled interchangeable blind selected from the plurality of interchangeable blinds to be deployed from the cylindrical roller;
wherein the spring return is a mechanical structure;
wherein the spring return disables the operation of the clutch such that the clutch can rotate in a direction that spools the selected interchangeable blind onto the cylindrical roller;
wherein the spring return is a spring-loaded device;
wherein the spring return stores the energy necessary to rotate the cylindrical roller in a manner that respools the interchangeable blind selected from the plurality of interchangeable blinds back onto the cylindrical roller.

14. The portable backdrop system for filming and photography according to claim 13
wherein the fastening structure comprises a zipper structure; wherein the zipper structure comprises a first chain structure and a second chain structure;

wherein the second chain structure attaches an interchangeable blind selected from the plurality of interchangeable blinds to first chain structure on the roller clutch and spring system by attaching the selected interchangeable blind to the binding strip of the roller clutch and spring system.

15. The portable backdrop system for filming and photography according to claim 14
wherein the plurality of eyebolts further comprises a first eyebolt and a second eyebolt;
wherein the first eyebolt is an eyebolt that attaches to the lateral face of the housing at a location between the first congruent end and the second eyebolt;
wherein the second eyebolt is an eyebolt that attaches to the lateral face of the housing at a location between the second congruent end and the first eyebolt.

16. The portable backdrop system for filming and photography according to claim 15
wherein the second chain attaches to the first chain;
wherein the first chain attaches to the binding strip of the roller clutch and spring system; wherein the second chain attaches to the interchangeable blind selected from the plurality of interchangeable blinds that attaches to the binding strip;
wherein each interchangeable blind selected from the plurality of interchangeable blinds is formed with a second chain.

17. The portable backdrop system for filming and photography according to claim 16
wherein each of the plurality of suction cups suspends the roller clutch and spring system from an attachment surface;
wherein each of the plurality of suction cups further comprises a hook;
wherein each of the plurality of suction cups hooks to an eyebolt selected from the plurality of eyebolts;
wherein the plurality of suction cups comprises a first suction cup and a second suction cup;
wherein the first suction cup is the suction cup selected from the plurality of suction cups that attaches the first eyebolt of the plurality of eyebolts to the attachment surface;
wherein the second suction cup is the suction cup selected from the plurality of suction cups that attaches the second eyebolt of the plurality of eyebolts to the attachment surface.

18. The portable backdrop system for filming and photography according to claim 17
wherein each of the plurality of S-hooks suspends the roller clutch and spring system from an attachment surface;
wherein each of the plurality of S-hooks hooks to an eyebolt selected from the plurality of eyebolts;
wherein each of the plurality of S-hooks hooks the roller clutch and spring system to an attachment structure mounted on an attachment surface;
wherein the plurality of S-hooks comprises a first S-hook and a second S-hook;
wherein the first S-hook is the S-hook selected from the plurality of S-hooks that attaches the first eyebolt of the plurality of eyebolts to the attachment surface;
wherein the second S-hook is the S-hook selected from the plurality of S-hooks that attaches the second eyebolt of the plurality of eyebolts to the attachment surface.

* * * * *